United States Patent
Hoang

(10) Patent No.: US 11,595,210 B2
(45) Date of Patent: Feb. 28, 2023

(54) ACCURATE, REAL-TIME AND SECURE PRIVACY-PRESERVING VERIFICATION OF BIOMETRICS OR OTHER SENSITIVE INFORMATION

(71) Applicant: Inferati Inc., Bellevue, WA (US)

(72) Inventor: Luong Hoang, Bellevue, WA (US)

(73) Assignee: Inferati Inc., Bellevue, WA (US)

( * ) Notice: Subject to any disclaimer, the term of this patent is extended or adjusted under 35 U.S.C. 154(b) by 326 days.

(21) Appl. No.: 16/867,281

(22) Filed: May 5, 2020

(65) Prior Publication Data

US 2020/0358611 A1 Nov. 12, 2020

Related U.S. Application Data

(60) Provisional application No. 62/843,908, filed on May 6, 2019.

(51) Int. Cl.
*H04L 9/32* (2006.01)
*G06N 20/00* (2019.01)
*H04L 9/40* (2022.01)

(52) U.S. Cl.
CPC .............. *H04L 9/32* (2013.01); *G06N 20/00* (2019.01); *H04L 63/0861* (2013.01)

(58) Field of Classification Search
None
See application file for complete search history.

(56) References Cited

U.S. PATENT DOCUMENTS

| | | | |
|---|---|---|---|
| 10,599,984 B1 * | 3/2020 | Wubbels | G16H 50/20 |
| 2009/0100269 A1 | 4/2009 | Naccache | |
| 2012/0210413 A1 * | 8/2012 | Akula | H04L 63/0815 726/8 |
| 2014/0331059 A1 | 11/2014 | Rane et al. | |

(Continued)

OTHER PUBLICATIONS

Damousis et al., "Four Machine Learning Algorithms for Biometrics Fusion: A Comparative Study", Applied Computational Intelligence and Soft Computing, vol. 2012 |Article ID 242401, Oct. 2011. (Year: 2011).*

(Continued)

*Primary Examiner* — Piotr Poltorak
(74) *Attorney, Agent, or Firm* — Seed IP Law Group, LLP

(57) ABSTRACT

A facility for performing accurate and real-time privacy-preserving biometrics verification in a client-server environment is described. The facility receives the user's biometrics data such as face, voice, fingerprint, iris, gait, heart rate, etc. The facility then processes and applies various privacy-preserving techniques to this data to complete enrollment and authenticate users, including but not limited to: encrypting data with a key using homomorphic encryption techniques and sending the encryption to the server; the server computes directly on the encryption and returns the result, which is also encrypted under the same key, to the client; the client optionally performs post-processing and decryption (in any order) and obtains the enrollment or authentication result. The facility may repeat this process to increase security level, resulting in more than 1 round trip between the client and the server. Lastly, the facility employs methods that generalize to other privacy-preserving applications beyond biometrics verification.

28 Claims, 11 Drawing Sheets

(56) References Cited

U.S. PATENT DOCUMENTS

| | | | |
|---|---|---|---|
| 2014/0354405 | A1 | 12/2014 | Kocher et al. |
| 2015/0341350 | A1* | 11/2015 | Mandal ............... H04L 63/0838 726/6 |
| 2016/0180068 | A1* | 6/2016 | Das ..................... H04L 63/0861 726/7 |
| 2016/0217198 | A1 | 7/2016 | Lee et al. |
| 2017/0104752 | A1* | 4/2017 | Sakemi ................. H04L 9/0618 |
| 2018/0212782 | A1 | 7/2018 | Csik et al. |
| 2019/0050865 | A1* | 2/2019 | Sheets .................... G06F 21/83 |
| 2019/0206090 | A1* | 7/2019 | Ray ....................... G06F 12/023 |
| 2020/0162455 | A1* | 5/2020 | Lin ........................ H04W 12/47 |
| 2020/0228340 | A1* | 7/2020 | Blackhurst ............ H04L 9/3231 |

OTHER PUBLICATIONS

International Search Report dated Aug. 26, 2020, for International Application No. PCT/US2020/031521, 12 pages.

Badawi, et al., "The AlexNet Moment for Homomorphic Encryption: HCNN, the First Homomorphic CNN on Encrypted Data with GPUs," Institute for Infocomm Research ($I^2R$), A*Star, Singapore, 2009, arXiv preprint arXiv:1811.00778. (25 pages).

Bajard, et al., "A Full RNS Variant of FV like Somewhat Homomorphic Encryption Schemes," Springer, Cham., International Conference on Selected Areas in Cryptography, Aug. 2016 (pp. 423-442).

Chen, et al. "MobileFaceNets: Efficient CNNs for Accurate Real-Time Face Verification on Mobile Devices" Springer, Cham., Chinese Conference on Biometric Recognition, Aug. 2018 (pp. 428-438).

Cheon, et al., "A Full RNS Variant of Approximate Homomorphic Encryption," Springer, Cham., International Conference on Selected Areas in Cryptography, Aug. 2018 (pp. 347-368).

Cheon, et al., "Homomorphic encryption for arithmetic of approximate numbers," Springer, Cham., International Conference on the Theory and Application of Cryptology and Information Security, Dec. 2017 (pp. 409-437).

Chillotti, et al., "TFHE: Fast Fully Homomorphic Encryption over the Torus," *Journal of Cryptology*, 33(1), 2020 (pp. 34-91).

Dowlin, et al., "CryptoNets: Applying Neural Networks to Encrypted Data with High Throughput and Accuracy," Microsoft Research and Princeton University, Feb. 2016, 12 pages.

Fan, et al., "Somewhat Practical Fully Homomorphic Encryption," IACR Cryptology ePrint Archive, 2012 (19 pages).

He, et al., "Deep Residual Learning for Image Recognition," in Proceedings of the IEEE Conference on Computer Vision and Pattern Recognition, 2016 (12 pages).

Krizhevsky, et al., "ImageNet Classification with Deep Convolutional Neural Networks," *Advances in Neural Information Processing Systems*, 2012 (pp. 1097-1105).

Lou, et al., "SHE: A Fast and Accurate Deep Neural Network for Encrypted Data," *Advances in Neural Information Processing Systems*, 2019 (pp. 10035-10043).

Torfi, et al., "Text-Independent Speaker Verification Using 3D Convolutional Neural Networks," *2018 IEEE International Conference on Multimedia and Expo (ICME)*, IEEE, Jul. 2018 (pp. 1-6).

Wan, et al., "Generalized End-to-End Loss for Speaker Verification," *2018 IEEE International Conference on Acoustics, Speech and Signal Processing (ICASSP)*, Apr. 2018 (5 pages).

* cited by examiner

ACCURATE, REAL-TIME AND SECURE PRIVACY-PRESERVING VERIFICATION OF BIOMETRICS OR OTHER SENSITIVE INFORMATION

CROSS-REFERENCE TO RELATED APPLICATIONS

This Application claims the benefit of provisional U.S. Application No. 62/843,908, filed May 6, 2019 and entitled "Accurate, Real-Time and Secure Privacy-Preserving Verification of Biometrics or other Sensitive Information," which is hereby incorporated by reference in its entirety.

In cases where the present application conflicts with a document incorporated by reference, the present application controls.

BACKGROUND

In the era of cloud computing, almost all companies have access to sensitive personal data. Industries such as banking and insurance are subject to heavy regulation where strict "know your customer" rules require companies to establish strong identity proofing for consumers. In other sectors such as ecommerce and healthcare, the value of identity verification systems comes in the form of enhanced user experience and personalization and increased return on investment for organizations.

A typical identity verification system consists of two primary stages: (1) enrolling a user by either directly capturing such biometric characteristics as face, voice, fingerprint, etc., or capturing identity documents such as a driver's license or passport, and (2) verifying the user via the same method of capture to grant or deny access based on the candidate identity.

Biometric authentication is a technique which allows a computing device to determine if a particular user is using, attempting to access, authorized to access, etc., a computing device without requiring a traditional username or password. Biometric authentication is typically performed by obtaining biometric data from a user, such as their fingerprint, hand image, retinal image, facial image, facial image plus depth map, voice sample, etc. In typical use-cases, if the computing device determines that the obtained biometric data matches biometric data of the same type already provided by the user, the user is granted access to the computing device.

Many identity verification solutions employ Machine Learning or AI algorithms to learn and accurately recognize users' biometrics. In an example data flow, a client device first captures the user's face via a built-in camera, the user's voice via a built-in microphone, a user's fingerprint via a fingerprint scanner, etc. The server makes a user identification prediction and returns the results to the client for authentication. The authentication result optionally contains an access token which the client uses for obtaining authorization for performing certain tasks.

DETAILED DESCRIPTION

Figure 1:
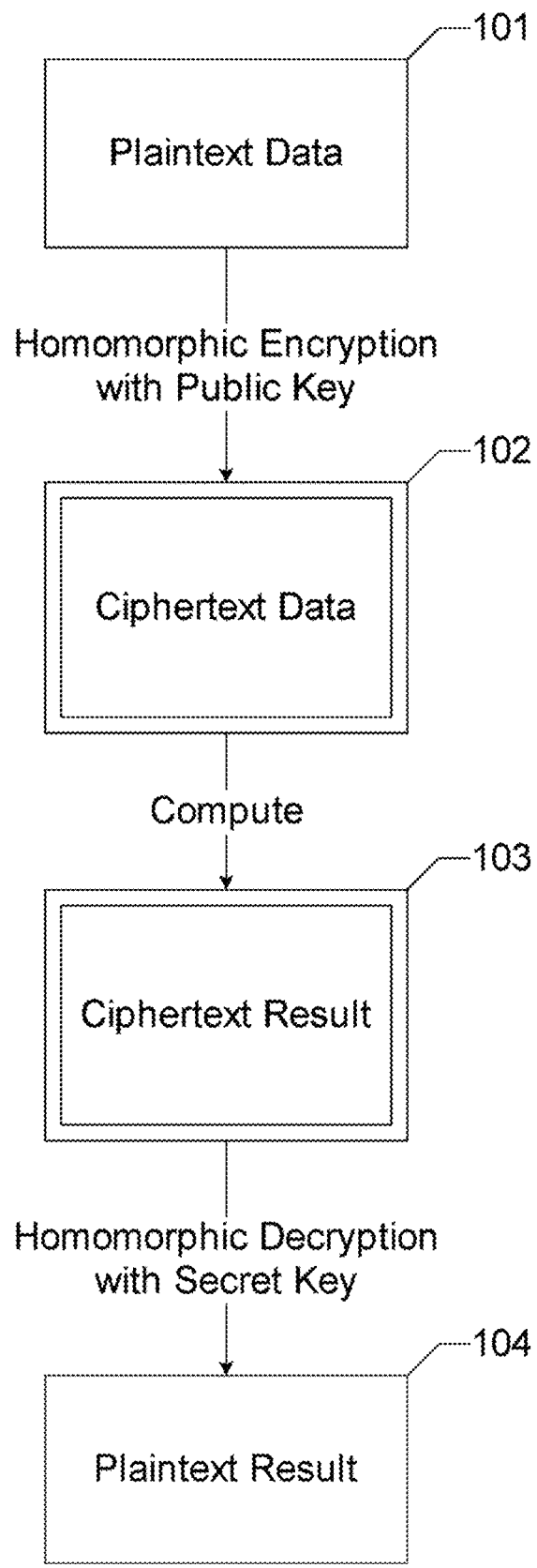
FIG. 1 is a flow diagram showing a process performed by the facility in some embodiments to encrypt input data with a homomorphic encryption scheme using a public key.

The inventors have identified numerous cases in which conventional identity verification systems cause privacy and security issues. First, a user's personal identity or biometric data is vulnerable to Man-in-the-Middle attacks when transmitted over a network without proper encryption. Transmitting user data without encryption allows a Man-in-the-Middle attacker to interpret, relay, or alter the data intercepted.

Additionally, unauthorized users can easily access stored personal data in a public-facing database, a risk that is further compounded if personal data is stored in plaintext form. Furthermore, encrypting and storing data such that the server is able to decrypt the data makes the data vulnerable to a data breach. Accordingly, the inventors have conceived and reduced to practice a software and/or hardware facility ("the facility") for verifying users' identities in ways that do not reveal the user's personal data to anyone, including the service provider. In particular, the facility verifies users' identities by performing accurate and real-time privacy-preserving biometrics verification.

In some embodiments, the facility operates in a client-server environment. In such embodiments, the client receives identity information from a user, and processes the identity information using privacy-preserving techniques such as encrypting the processed result using homomorphic encryption techniques. The encrypted data is transmitted to the server, which performs additional processing and returns the result to the client. In some embodiments, the facility performs the process with a single round-trip of communication between the client and server resulting in an end-to-end latency of approximately 1.5 seconds or less including network communication time. In some embodiments, the facility performs the process by using multiple round-trip communications to increase security. In some embodiments, the facility minimizes the amount of data transfer over the network and does not suffer from any substantial loss in prediction accuracy. In some embodiments, the facility employs methods that generalize to other privacy-preserving applications beyond biometrics verification.

Homomorphic Encryption is a technique that allows for encrypting data in a certain way such that the resulting encryption can be directly computed on while preserving the result. In mathematics, a group homomorphism $\phi$ from a group G to a group G' is a mapping from G into G' that preserves the group operation: $\phi(ab)=\phi(a)\phi(b)$ $\forall a,b \in G$. For example, the mapping from Z into Z_n, defined by $\phi(m)$=m mod n is a homomorphism. A Homomorphic Encryption method preserves additive and multiplicative structures of the rings of plaintexts and ciphertexts in the encryption and decryption operations.

The facility utilizes homomorphic encryption and biometric authentication methods to perform user authentication without exposing a user's biometric data. In some embodiments, the facility performs user authentication by homomorphically encrypting the user's biometric data after receiving the biometric data from the user. In some embodiments, the facility then stores the biometric data along with information indicating the biometric data belongs to the user ("enrolling" the user). In some embodiments, the facility asymmetrically encrypts the user's biometric data, instead of homomorphically encrypting the user's biometric data, before enrolling the user. In some embodiments, the user may provide additional biometric data to the facility, which the facility homomorphically encrypts and compares to the stored biometric data to determine if the same user provided the biometric data. In some embodiments, where the stored biometric data is homomorphically encrypted, the additional biometric data is asymmetrically encrypted.

In some embodiments, neither the stored biometric data nor the additional biometric data is decrypted when the facility determines if the same user provided the biometric data. In some embodiments, the facility decrypts the additional biometric data when the facility determines if the same user provided the biometric data. In some embodiments, the facility decrypts the stored biometric data when the facility determines if the same user provided the biometric data. In some embodiments, the facility then transmits information describing whether the same user provided the biometric data (an "authentication result"). In some embodiments, the facility encrypts the authentication result before transmitting the information to create a "ciphertext" authentication result.

FIG. 1 is a flow diagram showing a process performed by the facility in some embodiments to encrypt input data with a homomorphic encryption scheme using a public key. First, the facility receives plaintext data 101 and performs a homomorphic encryption on the plaintext data 101 using a public key to generate encrypted ciphertext data 102. In some embodiments, the facility receives the plaintext data 101 from a computing device, such as the computing device 1100 as user input. In some embodiments, the plaintext data is biometric data provided by the user, such as a fingerprint, hand image, retinal image, facial image, facial image plus depth map, voice sample, etc. In some embodiments, the facility uses the computing device 1100 to encrypt the plaintext data. The facility processes the encrypted ciphertext data 102 to produce the encrypted ciphertext result 103. In some embodiments, the facility uses the computing device 1100 to process the encrypted ciphertext data 102. Finally, the ciphertext result 103 is decrypted using the secret key to obtain the plaintext result 104. In some embodiments, the computing device 1100 stores the secret key and decrypts the ciphertext result 103.

Figure 2:
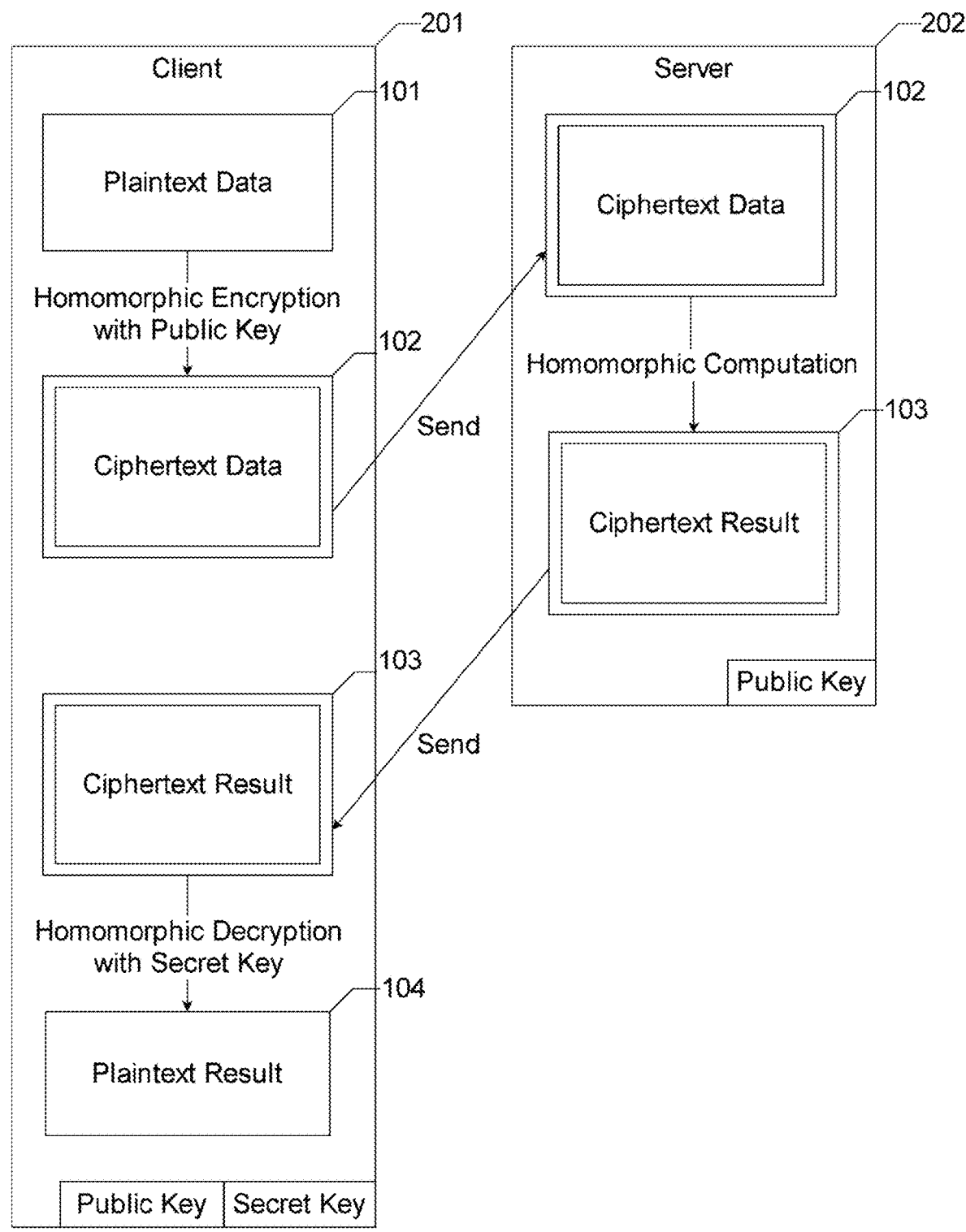
FIG. 2 is a flow diagram showing a client-server homomorphic computation process performed by the facility in some embodiments to encrypt the input data with a homomorphic encryption scheme using the public key on the client.

FIG. 2 is a flow diagram showing a client-server homomorphic computation process performed by the facility in some embodiments to encrypt the input data with a homomorphic encryption scheme using the public key on the client. The flow diagram of FIG. 2 includes a client 201 and a server 202. The client 201 has a public key and a secret key. The server 202 includes a public key. The client 201 first obtains plaintext data 101. In some embodiments, the facility obtains plaintext data 101 through user input. In some embodiments, the plaintext data 101 includes biometric data. The client computer system 201 uses the public key to homomorphically encrypt the plaintext data 101 to obtain ciphertext data 102. The client 201 transmits the ciphertext data 102 to the server computer system 202.

The server 202 then performs homomorphic computations on the ciphertext data 102 to produce a ciphertext result 103. The server 202 transmits the ciphertext result 103 to the client computer 201. The client computer system 201 receives the ciphertext result 103 and decrypts the ciphertext result 103 with the secret key to retrieve the plaintext result 104.

In various embodiments, the facility implements different homomorphic encryption schemes such as the Brakerski/Fan-Vercauteren scheme (BFV) (discussed further in Fan, J., & Vercauteren, F. (2012). Somewhat Practical Fully Homomorphic Encryption. IACR Cryptology ePrint Archive, 2012, 144); the Cheon-Kim-Kim-Song (CKKS) scheme (discussed further in Cheon, J. H., Kim, A., Kim, M., & Song, Y. (2017, December). Homomorphic encryption for arithmetic of approximate numbers. In International Conference on the Theory and Application of Cryptology and Information Security (pp. 409-437). Springer, Cham); or the TFHE scheme (discussed further in Chillotti, I., Gama, N., Georgieva, M., & Izabachène, M. (2020). TFHE: fast fully homomorphic encryption over the torus. Journal of Cryptology, 33(1), 34-91). In various embodiments, the facility also implements an improved version of the BFV scheme (discussed further in Bajard, J. C., Eynard, J., Hasan, M. A., & Zucca, V. (2016, August). A full RNS variant of FV like somewhat homomorphic encryption schemes. In International Conference on Selected Areas in Cryptography (pp. 423-442). Springer, Cham); and/or an improved version of the CKKS scheme (discussed further in Cheon, J. H., Han, K., Kim, A., Kim, M., & Song, Y. (2018, August). A full RNS variant of approximate homomorphic encryption. In International Conference on Selected Areas in Cryptography (pp. 347-368). Springer, Cham). Each of the foregoing is hereby incorporated by reference in its entirety. In cases where the present application and a document incorporated by reference conflict, the present application controls.

In some embodiments, the facility implements a security level for the homomorphic encryption scheme, if any is used, by setting default values for a number of parameters such as: the degree of the polynomial modulus n, the ciphertext coefficient modulus q and the plaintext modulus t, a noise standard deviation σ, etc. In some embodiments, the facility adopts these parameter values in both the client and the server components to ensure consistent encryption and expected computation result.

In various embodiments, the facility collects a user's biometrics data via: capturing an image of the user's face using a built-in camera available on the client hardware, capturing a recording of the user's voice using a built-in microphone on the client hardware, capturing a video recording of the user's live-action response to a One-Time-Authorization-Code, capturing a video recording of the user's live-action response to a Knowledge-Based-Authentication question, capturing a fingerprint via a fingerprint scanner, etc.

In some embodiments, the facility enrolls a user by: (1) using one or more measurements taken from the user's biometric data to generate, using a Client Pre-Processor algorithm, a data blob ("Blob"), consisting of an arbitrary number of integers or floating point numbers, which may optionally be obfuscated such that it cannot be used to reconstruct the user's biometric data but can be used to verify the user ("Obfuscated Blob"); and (2) sending the Blob to the server, which may optionally perform additional computation using a Server Enroller program, to be stored in a database as the user's Enrollment Blob. In some embodiments, the facility uses the process depicted in FIG. 3 to perform these actions.

Figure 3:
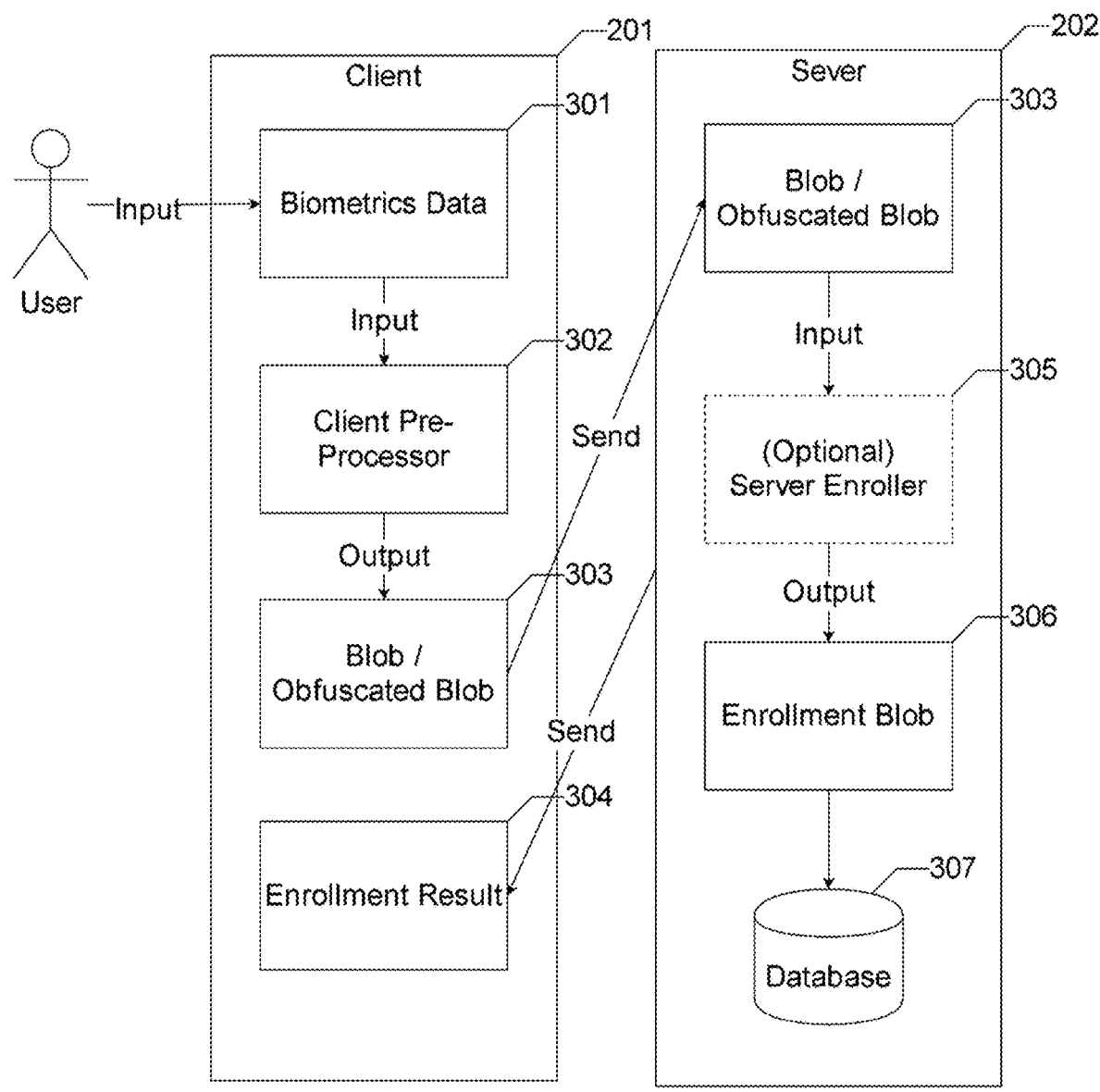
FIG. 3 is a flow diagram showing an enrollment process performed by the facility in some embodiments to receive input biometric data from the user.

FIG. 3 is a flow diagram showing an enrollment process performed by the facility in some embodiments to receive input biometric data from the user. The client 201 collects biometric data 301 from the user and passes it to the client pre-Processor 302. The pre-processor 302 produces a blob 303 from the biometric data 301 and transmits the blob to the server 202. In some embodiments, the facility obfuscates the blob 302 before transmitting the blob 302 to the server 202. The facility uses a server enroller 305 to produce an enrollment blob 306 and stores in the enrollment blob 306 in the database 307.

In some embodiments, the server 202 does not use the server enroller 305 to produce the enrollment blob 306. The server 202 then transmits an enrollment result 304, including data indicating whether the server successfully enrolled the blob, to the client 201.

In some embodiments, the facility authenticates a user using a Client Pre-Processor and a Server Verifier as follows: (1) using measurements taken from a candidate user's biometric data to generate, using a Client Pre-Processor algorithm, a candidate Blob or a candidate Obfuscated Blob ("Candidate Blob"); (2) passing the new Candidate Blob and the stored Enrollment Blob as inputs to another algorithm running on the server ("Server Verifier"), to predict whether the two blobs describe the same user; (3) the resulting prediction is returned to the client and the authentication result is determined. In some embodiments, the process, depicted in FIG. 4, is completed in a single round-trip of communication.

Figure 4:
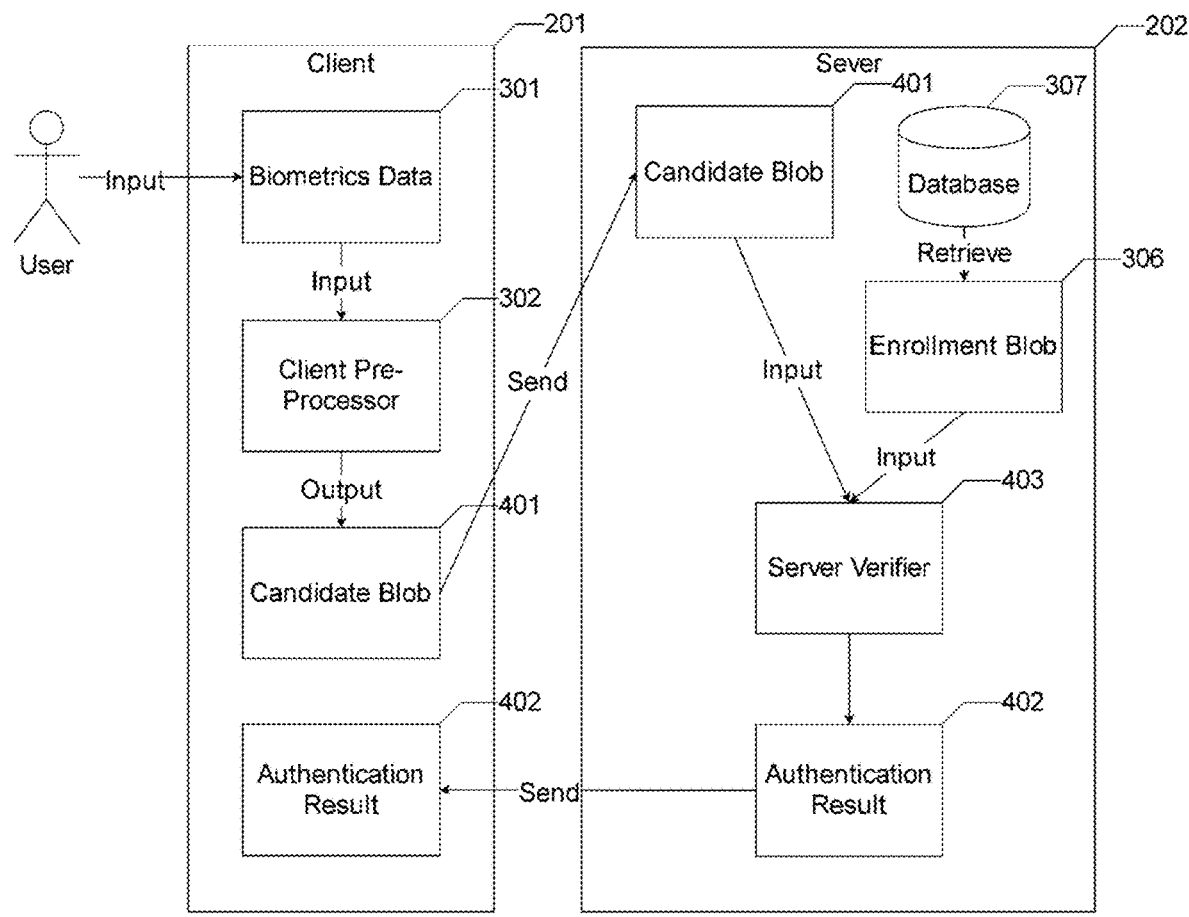
FIG. 4 is a flow diagram showing an authentication process performed by the facility in some embodiments to receive input biometric data from the user.

FIG. 4 is a flow diagram showing an authentication process performed by the facility in some embodiments to authenticate biometric data received from the user. The client then pre-processes the biometric data with the client pre-processor 302 to obtain the candidate blob 401 and transmits the candidate blob 401 to the server 202. After the server 202 receives the candidate blob 401, the server retrieves the enrollment blob 306 previously stored in the database 307. The server then passes both the candidate blob 401 and the enrollment blob 306 to the server verifier 403. The server verifier 403 determines if the candidate blob 401 and the candidate blob 306 contain biometric data from the same user by computing an authentication result 402. The server verifier 403 then transmits the authentication result 402 back to the client 201.

In some embodiments, the facility performs user authentication using an additional Client Post-Processor as follows: (1) using measurements taken from a candidate user's biometric data to generate, via the Client Pre-Processor, a Candidate Blob; (2) passing the new Candidate Blob and the stored Enrollment Blob as inputs to another algorithm running on the server ("Server Processor"), to compute an intermediate result; (3) returning the intermediate result to the client and where the client performs an additional post-processing step, using another algorithm ("Client Post-Processor"), to obtain the final authentication result. In some embodiments, this process, illustrated as part of FIG. 5, is completed in a single round trip of communication between the client and server.

Figure 5:
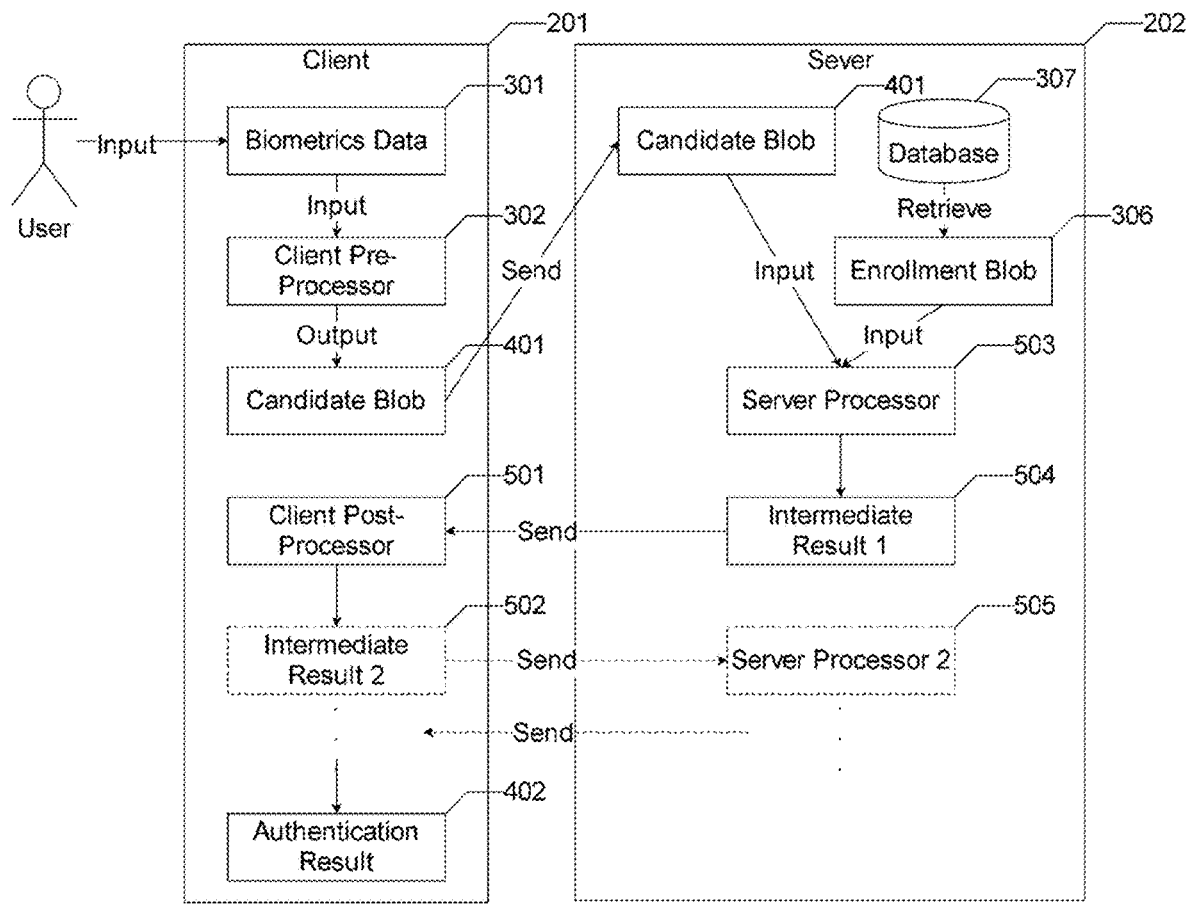
FIG. 5 is a flow diagram showing an authentication process performed by the facility in some embodiments to receive input biometric data from the user.

In some embodiments, the facility uses multiple round trips of communication between the client and server to perform the authentication process described in FIG. 5 by: (1) using a plurality of measurements taken from a candidate user's biometric data to generate, via the Client Pre-Processor, a Candidate Blob; (2) passing the new Candidate Blob and the stored Enrollment Blob as inputs to the 1st Server Processor, to compute the first intermediate result; (3) transmit the result to the 1st Client Post-Processor; (4) transmit a second result obtained from the client post-processor to the 2nd Server Processor and repeating the process for a predetermined number of times to be completed in multiple round trips of communication.

FIG. 5 is a flow diagram showing an authentication process performed by the facility in some embodiments to receive input biometric data from the user. In FIG. 5, the client computer system 201 collects the biometric data 301 from the user, passes it to the client pre-processor 302 to obtain the candidate blob 401 and transmits the candidate blob 401 to the server computer system 202, in the same manner performed in FIG. 4. After the server 202 receives the candidate blob 401, the server 202 retrieves the enrollment blob 306 from the database 307 and passes it together with the candidate blob 401 as inputs to the server processor 503. The server processor 503 computes a first intermediate result 504 which is transmitted to the client 201. The client post-processor 501 then performs further computations on the intermediate result 504 to obtain a second intermediate result 502. In some embodiments, the client post-processor prepares the second intermediate result based on a determination that the first intermediate result was positive. The second intermediate result is sent to the second server processor 505 and the process repeats a predetermined number of times, until the server transmits the authentication result 402 to the client 201. The client 201 then decrypts the authentication result 402.

In some embodiments, the facility allows a client to enroll a user by using either asymmetric encryption or homomorphic encryption by: (1) storing a parameter that indicates whether the facility should encrypt the Enrollment Blob with a homomorphic encryption scheme ("Homomorphic Enrollment Blob") using a public-private key ("Homomorphic Key Pair") or with a conventional asymmetric encryption scheme ("Asymmetric Enrollment Blob") using a public-private key pair ("Asymmetric Key Pair"); and (2) storing a parameter that indicates whether to encrypt the Candidate Blob with a Homomorphic Key Pair ("Homomorphic Candidate Blob") or with an Asymmetric Key Pair ("Asymmetric Candidate Blob"). In some embodiments, the asymmetric or homomorphic encryption of the candidate blob is performed on the client device before being sent to the server so that all blobs are always encrypted in transit and at rest. In some embodiments, the homomorphic enrollment blob cannot be decrypted by the server, while the asymmetric enrollment blob can be. FIG. 6 depicts two different embodiments of the facility which either generate a Homomorphic Enrollment Blob or an Asymmetric Enrollment Blob.

Figure 6A:
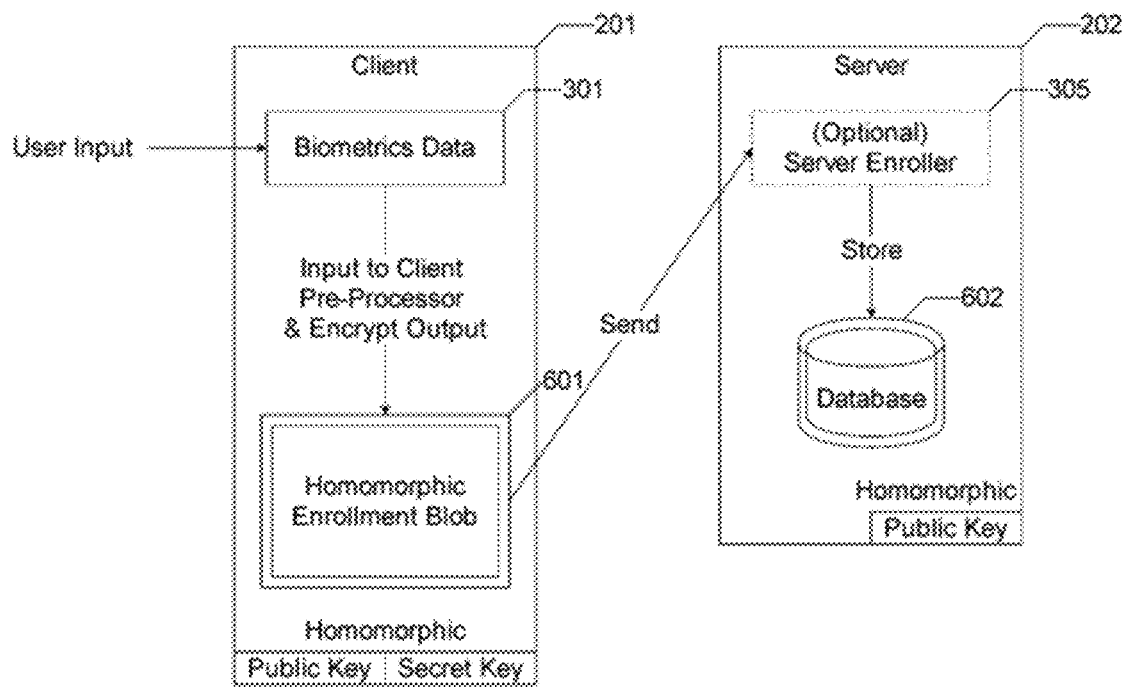
FIG. 6A is a flow diagram showing an enrollment process performed by the facility in some embodiments in which the enrollment data is encrypted with a homomorphic encryption scheme.

FIG. 6A is a flow diagram showing an enrollment processes performed by the facility in some embodiments in which the enrollment data is encrypted with a homomorphic encryption scheme. The process depicted by FIG. 6A illustrates an enrollment process where user data is homomorphically encrypted, used by the facility in some embodiments. The client 201 collects the biometric data 301 from the user, uses the client pre-processor to produce the enrollment blob and homomorphically encrypts the enrollment blob to obtain the homomorphic enrollment blob 601 to be transmitted to the server computer system 202. The server 202 stores the homomorphic enrollment blob 601 in the database 602. In some embodiments, the server 202 uses a server enroller 305 to perform additional computation on the blob 601 and stores the result in the database 602. In some embodiments, where the facility homomorphically encrypts the blob, only the client 201 has access to the secret key that can decrypt the homomorphic enrollment blob 601.

Figure 6B:
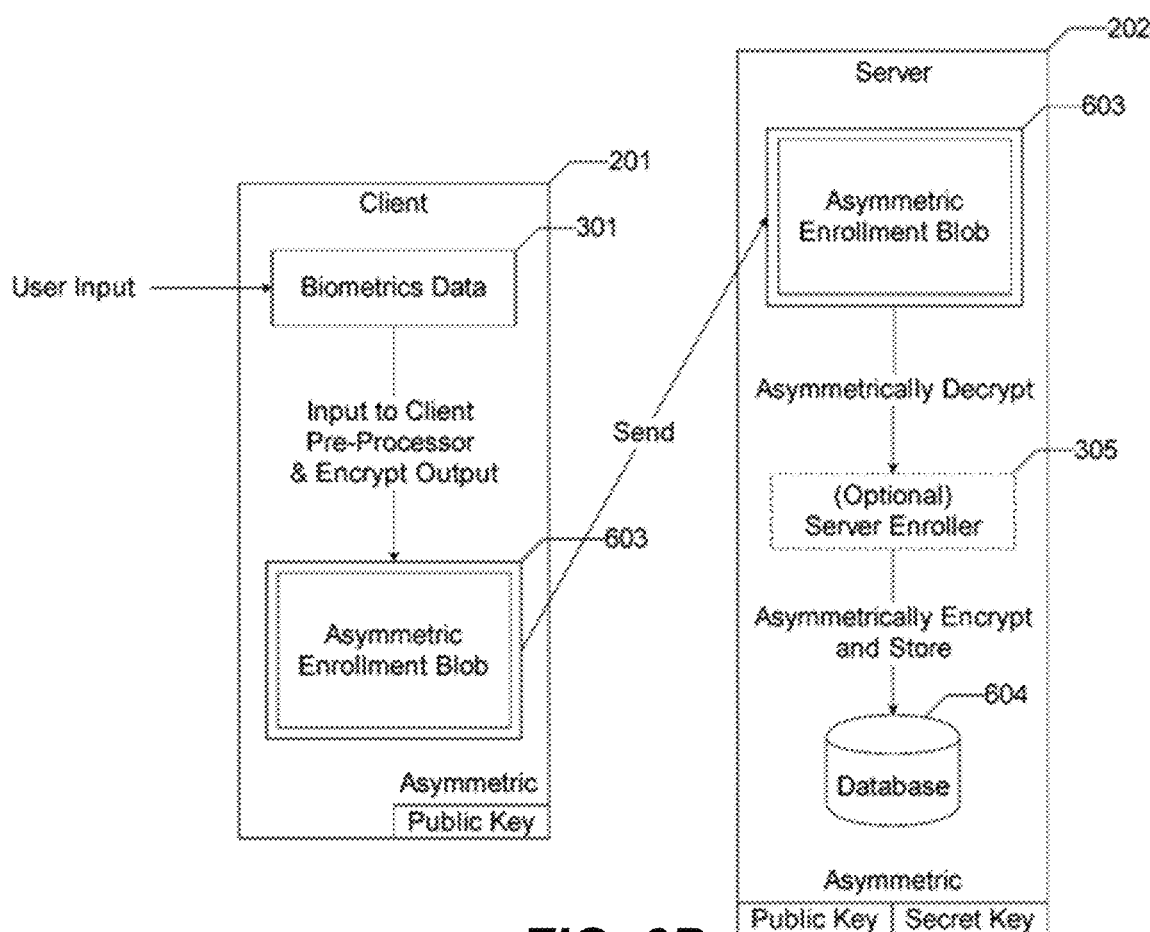
FIG. 6B is a flow diagram showing an enrollment process performed by the facility in some embodiments in which the enrollment data is encrypted with a homomorphic encryption scheme.

FIG. 6B is a flow diagram showing an enrollment process performed by the facility in some embodiments in which the enrollment data is encrypted with a homomorphic encryption scheme. The process depicted by FIG. 6B, illustrates an enrollment process where user data is encrypted with traditional asymmetric encryption. The client 201 receives biometrics data 301 from user input, and processes the biometrics data 301 to produce an asymmetric enrollment blob 603 and transmit the asymmetric enrollment blob 603 to the server 202. The server 202 stores the encrypted asymmetric enrollment blob 603 in the database 604. In some embodiments, the server 202 decrypts the blob 603 and uses the server enroller 305 to perform additional computations on the asymmetric enrollment blob 603 before storing the asymmetric enrollment blob 603 in the database 604. In some embodiments, where the facility asymmetrically encrypts the blob, only the server 202 has access to the secret key to decrypt the asymmetric enrollment blob 603.

In some embodiments, the facility performs end-to-end secure plaintext enrollment and plaintext authentication by: (1) generating, at enrollment time, an Asymmetric Key Pair on the server and a different Asymmetric Key Pair on the client device; (2) sharing the public key of the server's Asymmetric Key Pair with the client, and sharing the public key of the client's Asymmetric Key Pair with the server; (3) using a plurality of measurements taken from a user's biometric data to generate via the Client Pre-Processor an Enrollment Blob; (4) encrypting the Enrollment Blob on the client with the server's public key and sending the resulting Asymmetric Enrollment Blob to the server to be stored; (5) in the authentication step, the candidate user to be verified provides the same type of biometric data to the client, which generates a new Candidate Blob; (6) encrypting the Candidate Blob on the client with the server's public key and sending the resulting Asymmetric Candidate Blob to the server; (7) the Asymmetric Candidate Blob and the Asymmetric Enrollment Blob are passed as inputs to the Server Verifier or Server Processor ("Server Program"); (8) the Server Program decrypts both the Asymmetric Enrollment Blob and the Asymmetric Candidate Blob using its own secret key, and determines whether the decrypted plaintexts indicate biometric data from the same user to obtain a plaintext output; (9) to protect the plaintext output from being stolen or intercepted, the Server Program encrypts the plaintext output with the client's public key and sends the encryption to the client; (10) the client decrypts the server output with its own secret key; (11) the client then performs a Conditional Post-Processing Step: if the Server Program is the Server Verifier, its output result is already the desired authentication result, if the Server Program is the Server Processor, its output result is passed as input to the Client Post-Processor to obtain the desired verification result.

Figure 7:
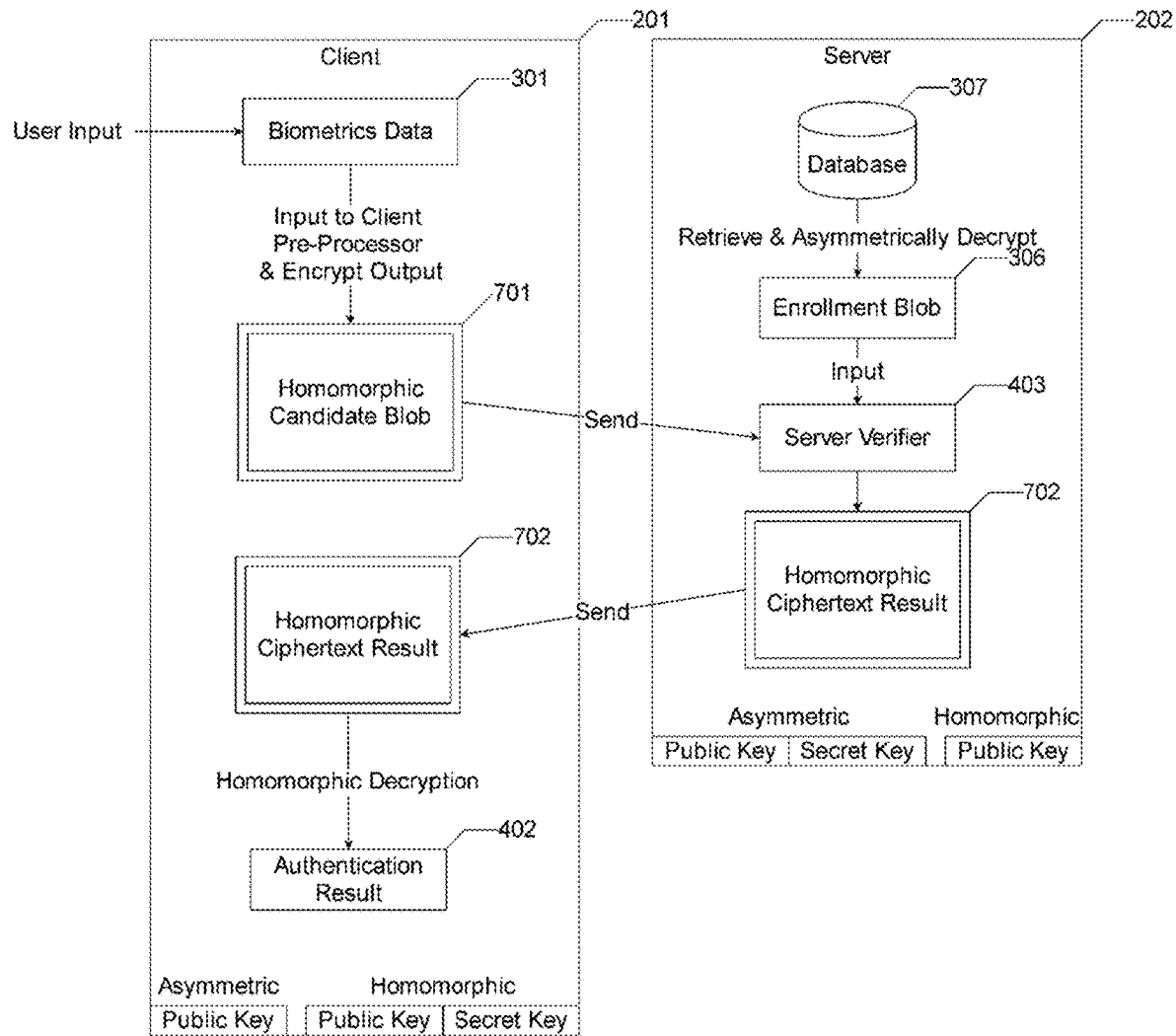
FIG. 7 is a flow diagram showing an authentication process performed by the facility in some embodiments in which the enrollment data is encrypted with a conventional asymmetric encryption scheme and the candidate data is encrypted with a homomorphic encryption scheme.

FIG. 7 is a flow diagram showing an authentication process performed by the facility in some embodiments, in which the enrollment data is encrypted with a conventional asymmetric encryption scheme and the candidate data is encrypted with a homomorphic encryption scheme. Here, the server computer system 202 has previously collected an asymmetric enrollment blob from the client 201 using one of the processes previously described in FIGS. 3-6. First, the client 201 collects biometric data 301 from the user and generates a homomorphically encrypted candidate blob 701 to send to the server. After receiving the homomorphically encrypted candidate blob 701, the server retrieves the enrollment blob 306 from the database 307 and asymmetrically decrypts the enrollment blob 306. The server 202 then passes the enrollment blob 306 and the candidate blob 701 as inputs to the server verifier 403. The server verifier 403 determines whether the enrollment blob 306 and homomorphic candidate blob 701 include biometric data from the same user and returns a homomorphic ciphertext result 702. The server 202 transmits the homomorphic ciphertext result 702 to the client 201. The client 201 uses its homomorphic secret key to decrypt the ciphertext result 702 to obtain the authentication result 402. In the process described by FIG. 7, the server 202 is not able to view the content of the homomorphic candidate blob 701 or the server verifier's 403 output because the server does not have access to the homomorphic secret key. In some embodiments, the client 201 does not have access to the asymmetric secret key, while the server 202 does not have access to the homomorphic secret key.

Figure 8:
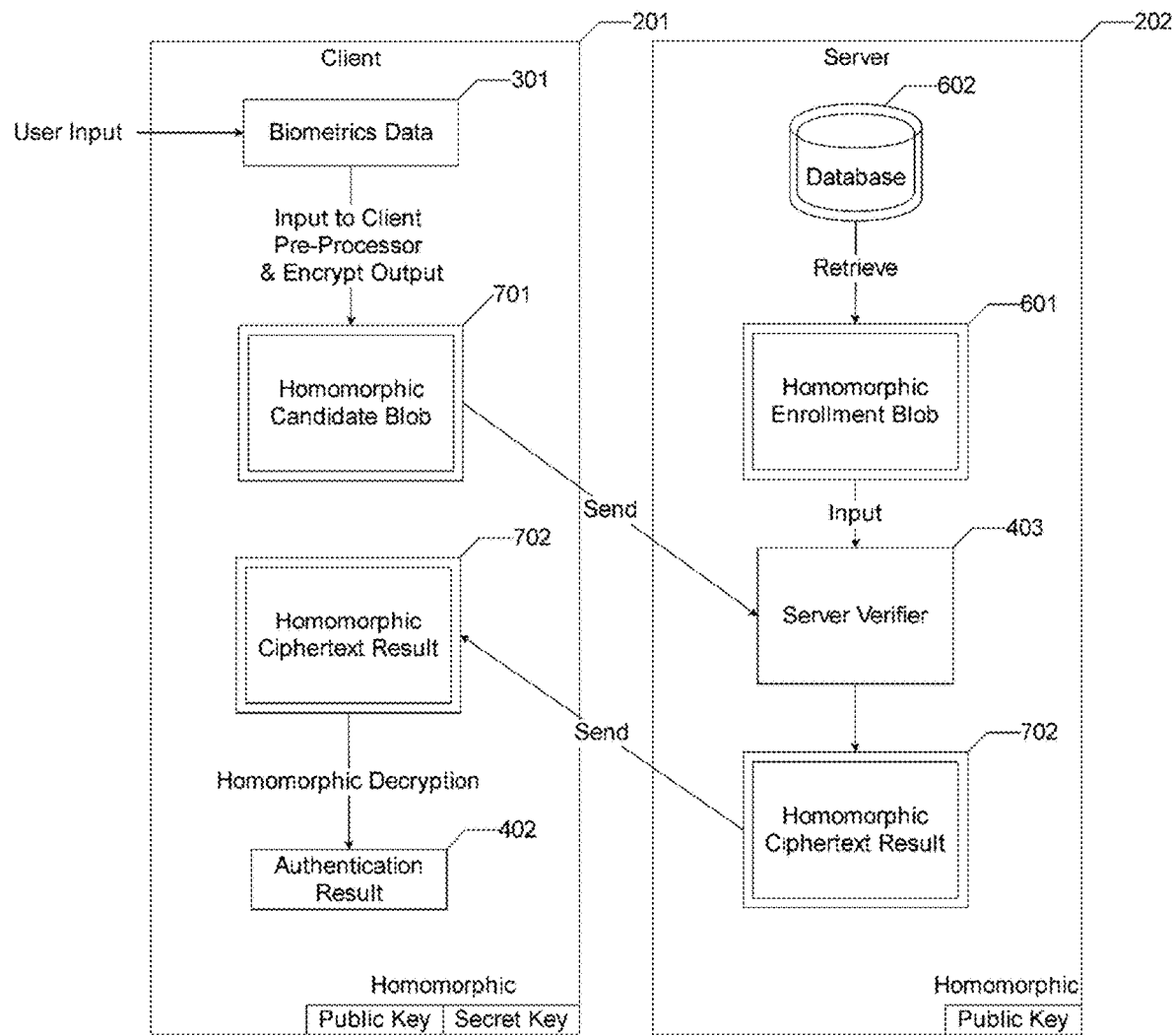
FIG. 8 is a flow diagram showing an authentication process performed by the facility in some embodiments in which both the enrollment data and the candidate data are encrypted with a homomorphic encryption scheme, using the same public key.

FIG. 8 is a flow diagram showing an authentication process performed by the facility in some embodiments, in which both the enrollment data and the candidate data are encrypted with a homomorphic encryption scheme, using the same public key. Here, the server computer system 202 has previously collected an asymmetric enrollment blob from the client 201 using one of the processes previously described in FIGS. 3-6. The client computer system 201 collects biometric data 301 from the user and generates a homomorphic candidate blob 701 to send to the server 202. After receiving the homomorphic candidate blob 701, the server 202 retrieves the homomorphic enrollment blob 601 from the database 602, which was previously stored on the server using the process previously described in FIG. 6. The server 202 passes the homomorphic candidate blob 701 and the homomorphic enrollment blob 601 as inputs to the server verifier 403. The server verifier 403 determines whether the homomorphic candidate blob 701 and homomorphic enrollment blob 601 include biometric data from the same person and returns a homomorphic ciphertext result 702. The server transmits the homomorphic ciphertext result 702 to the client 201, which uses the homomorphic secret key to decrypt the homomorphic ciphertext result 702 to obtain the unencrypted authentication result 402. In the process described by FIG. 8, the server cannot view the content of the homomorphic candidate blob 701 and the homomorphic enrollment blob 601 because the server does not decrypt either blob to obtain the homomorphic ciphertext result.

Figure 9:
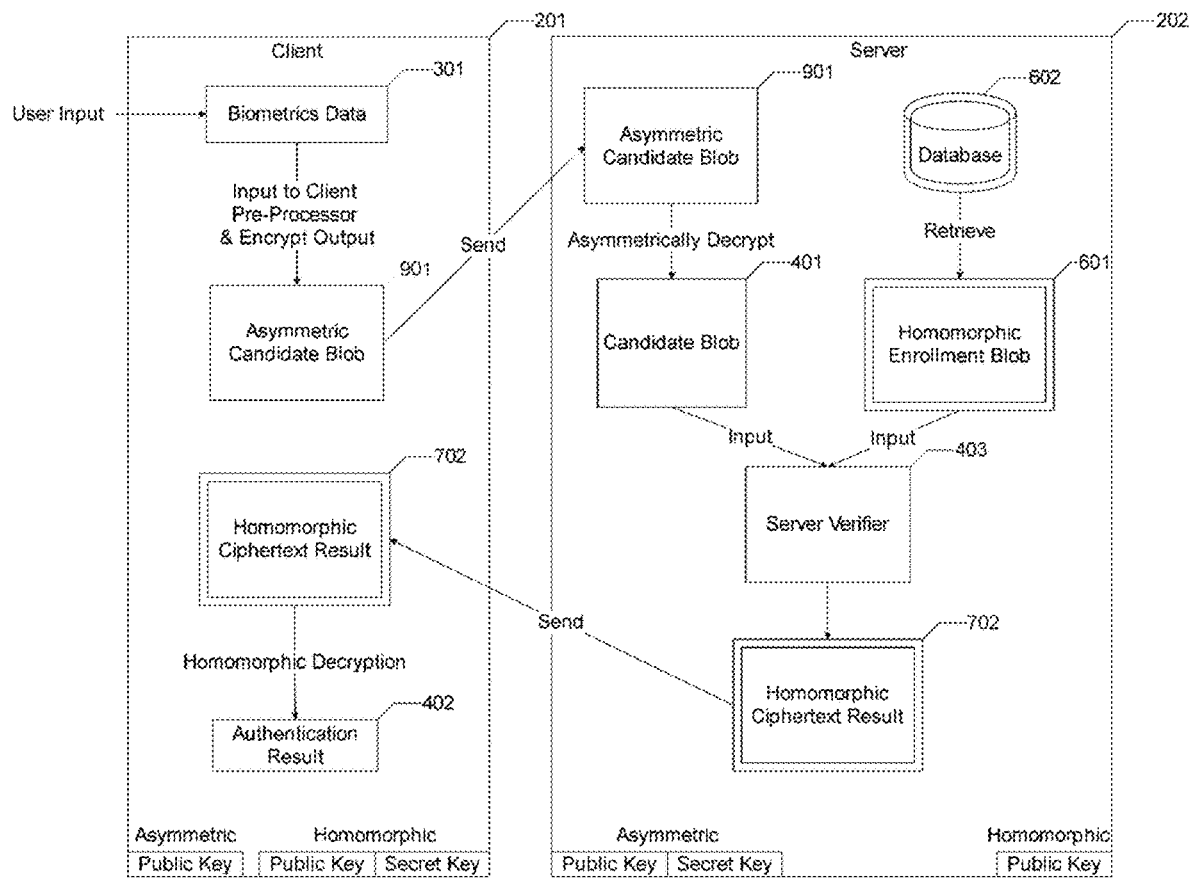
FIG. 9 is a flow diagram showing an authentication process performed by the facility in some embodiments in which the enrollment data is encrypted with a homomorphic encryption scheme and the candidate data is encrypted with a conventional asymmetric encryption scheme.

FIG. 9 is a flow diagram showing an authentication process performed by the facility in some embodiments, in which the enrollment data is encrypted with a homomorphic encryption scheme and the candidate data is encrypted with a conventional asymmetric encryption scheme. Here, the server computer system 202 has previously collected an asymmetric enrollment blob from the client 201 using one of the processes previously described in FIGS. 3-6. The client computer system 201 collects biometric data 301 from the user to generate an asymmetric candidate blob 901 and sends it to the server computer system 202. After receiving the asymmetric candidate blob 901, the server decrypts the asymmetric candidate blob 901 to obtain the unencrypted candidate blob 401. The server also retrieves the homomorphic enrollment blob 601 from the database 602. The server 202 passes the asymmetric candidate blob 901 and the homomorphic enrollment blob 601 blobs are as input to the server verifier 403. The server verifier 402 determines if the biometric data included in the homomorphic enrollment blob 601 and the asymmetric candidate blob 901 indicate the same user to compute an authentication result. The server verifier 403 returns the authentication result as a homomorphic ciphertext result 702. The server transmits the homomorphic ciphertext result 702 to the client 201. The client 201 decrypts the homomorphic ciphertext result 702 and obtains the unencrypted authentication result 402. In some embodiments, during the process described by FIG. 9, the server 202 is not able to view the content of the Enrollment Blob or the Server Program's output because the server 202 does not have access to the homomorphic secret key.

Under certain parameter settings, homomorphic encryption schemes allow batching multiple numbers into a single plaintext object ("Packed Plaintext") which can be encrypted into a single ciphertext ("Packed Ciphertext"). For example, when the plaintext modulus t is a prime number and congruent to 1 modulo (2*the polynomial modulus n), such as when t=40961 and n=4096, one can pack as many as n=4096 numbers into a single Packed Ciphertext. The Packed Ciphertext allows computations to be done simultaneously on all numbers in a single-instruction-multiple-data manner. In addition, the Packed Ciphertext consumes only as much memory and disk footprint as a single ciphertext. Thus, it drastically reduces computation time, memory usage, disk storage consumption, network communication overhead and latency.

In some embodiments, the facility uses Packed Ciphertext to improve performance by: (1) setting the homomorphic encryption scheme parameters to enable batching multiple numbers into a Packed Ciphertext; (2) at enrollment time, after the client generates the Enrollment Blob, the client batches and encrypts all numbers contained in the blob into a minimum number of Enrollment Packed Ciphertexts; (3) the resulting Packed Ciphertexts are sent to the server for storage; (4) in the authentication step, a similar process is applied to the Candidate Blob to obtain a minimum number of Candidate Packed Ciphertexts; (5) the Server Program takes as input the Enrollment Packed Ciphertexts and the Candidate Packed Ciphertexts to compute and return at least one Output Packed Ciphertexts; (6) the client receives the Output Packed Ciphertexts, decrypts them, and retrieves the resulting numbers to proceed with the Conditional Post-Processing Step.

In some embodiments, each of the Client Pre-Processor, the Server Verifier, the Server Processor, and the Client Post-Processor is implemented in an end-to-end computer-implemented program able to receive input including user's biometric data to enroll that user, and to receive input including another measurement of biometric data to predict whether the two measurements belong to the same user. In some embodiments, the facility uses a Machine Learning or AI algorithm ("AI Model") such as a neural network, decision tree, support vector machines, random forests, etc., to implement the client pre-processor, server verifier, server processor, and the client post-processor.

In some embodiments, the facility trains, such as in an offline setting, an AI Model for biometrics verification, such as a deep convolutional neural network or recurrent neural network for face verification or speech verification, on publicly available datasets or on its own constructed datasets. In some embodiments, once a model is obtained with the desired performance metrics, such as by demonstrating adequate accuracy on a test set, the model is saved for use in predicting whether two biometric measurements belong to the same user.

In some embodiments, the AI Model takes two inputs: (1) a plurality of measurements of the user's biometric data obtained at enrollment time, B_e; and (2) a plurality of measurements of the same type of biometric data from a potentially different user obtained at authentication time, B_a. For example, B_e and B_a can be two face images or two voice recordings. In some embodiments, the AI Model computes a function f(B_e, B_a) whose output is a floating point number representing the measure of similarity between the two inputs, with a value higher than a predefined threshold indicating similarity and otherwise dissimilarity, and where a higher value indicates higher confidence level in the prediction. In some embodiments, the AI Model computes a function f(B_e, B_a) whose output is a floating point number representing the measure of dissimilarity or distance between the two inputs, with a value higher than a predefined threshold indicating dissimilarity, and where a higher value indicates higher confidence level. In some embodiments, the AI Model computes a function f(B_e, B_a) whose output is a two-dimensional vectors containing floating point numbers where if the first entry contains a larger value than the second entry then the two inputs are predicted to be similar, and otherwise predicted to be dissimilar, and where the absolute difference between the two entries indicates the confidence level. In some embodiments, the AI Model computes a function f(B_e, B_a) whose output is an integer whose value is either 0 or 1 indicating if the authentication is denied or granted, respectively.

In some embodiments, the Server Processor computes the authentication result as an integer whose value is either 0 or 1, as described in the above paragraph. In some embodiments, the facility encrypts the authentication result with a Homomorphic Encryption scheme and multiplies the result with a number which represents an access token. In some embodiments, if the client receives an indication that the user is authenticated, the resulting value after decryption indicates the access token which the client can use to obtain authorization for later tasks. In some embodiments, if authentication is denied, the decrypted value is 0.

The inventors have also recognized and appreciated that practical homomorphic encryption schemes have noise terms that are added to the encryption of plaintext, and that repeated computation on the resulting ciphertexts may further increase the amount of noise to a level that makes the result no longer correct when decrypted. The maximum amount of noise allowed for a ciphertext to be correctly decryptable depends on the coefficient modulus q and the plaintext modulus t. When ciphertexts are added to or multiplied with each other, the noise level in the resulting ciphertext is typically larger. In terms of noise growth, a multiplication operation creates a significantly larger noise growth as compared to an addition operation. As a result, the number of computations that can be practically applied to an input set of ciphertexts depends largely on the number of successive multiplications involved ("Multiplicative Depth"). The maximum level of Multiplicative Depth for any algorithm to be correctly performed on ciphertexts depends on the homomorphic encryption scheme and its parameter settings. In some embodiments, the facility determines this maximum Multiplicative Depth from theoretical bounds such as those described in Fan, J., & Vercauteren, F. (2012), previously incorporated by reference. In some embodiments, the facility determines the maximum Multiplicative Depth from empirical trials on the expected inputs.

In some embodiments, the facility employs various methods to implement neural networks for efficient inference over homomorphically encrypted data, such as the methods discussed in Gilad-Bachrach, R., et. al. (Gilad-Bachrach, R., Dowlin, N., Laine, K., Lauter, K., Naehrig, M., & Wernsing, J. (2016, June). Cryptonets: Applying neural networks to encrypted data with high throughput and accuracy. In International Conference on Machine Learning (pp. 201-210)). In some embodiments, the facility implements methods to efficiently perform homomorphic operations over hardware accelerated data, such as with a graphics processing unit, discussed further in Badawi, A. A., et. al. (Badawi, A. A., Chao, J., Lin, J., Mun, C. F., Sim, J. J., Tan, B. H. M., . . . & Chandrasekhar, V. R. (2018). The alexnet moment for homomorphic encryption: Hcnn, the first homomorphic cnn on encrypted data with gpus. arXiv preprint arXiv: 1811.00778). In some embodiments, the facility employs various methods to implement deep neural networks, i.e. neural networks with many layers, for efficient inference over homomorphically encrypted data. In some embodiments, the facility converts the neural network layers to Boolean circuits that translate into efficient homomorphic operations under the TFHE encryption scheme, discussed further in Lou, Q., & Jiang, L. (Lou, Q., & Jiang, L. (2019). SHE: A Fast and Accurate Deep Neural Network for Encrypted Data. In Advances in Neural Information Processing Systems (pp. 10035-10043)). Each of the foregoing is hereby incorporated by reference in its entirety. In cases where the present application and a document incorporated by reference conflict, the present application controls.

In various embodiments, the facility constructs an AI Model for face verification by starting from any of the following, but not limited to, base architectures: support vector machines, convolutional neural networks with variable number of layers; deep convolutional neural network, discussed further in Krizhevsky, A., et. al (Krizhevsky, A., Sutskever, I., & Hinton, G. E. (2012). Imagenet classification with deep convolutional neural networks. In Advances in neural information processing systems (pp. 1097-1105)); a deep residual network, discussed further in He, K., et. al (He, K., Zhang, X., Ren, S., & Sun, J. (2016). Deep residual learning for image recognition. In Proceedings of the IEEE conference on computer vision and pattern recognition (pp. 770-778)); or MobileFaceNets, discussed further in Chen, S., et, al (Chen, S., Liu, Y., Gao, X., & Han, Z. (2018, August). Mobilefacenets: Efficient cnns for accurate real-time face verification on mobile devices. In Chinese Conference on Biometric Recognition (pp. 428-438). Springer, Cham). In some embodiments, prior to running the base architecture, an optional feature extraction step is applied to the input image. In some embodiments, the facility extracts BRIEF and ORB descriptors from the image to be used as one of the inputs to the face verification model. Each of the foregoing is hereby incorporated by reference in its entirety. In cases where the present application and a document incorporated by reference conflict, the present application controls.

In some embodiments, the facility constructs an AI Model for speaker verification by starting from any of the following, but not limited to, base architectures: support vector machines, decision trees, feed forward neural networks, convolutional neural networks with variable number of layers; 3D convolutional neural network, discussed further in Torfi, A., et. al (Torfi, A., Dawson, J., & Nasrabadi, N. M. (2018, July). Text-independent speaker verification using 3d convolutional neural networks. In 2018 IEEE International Conference on Multimedia and Expo (ICME) (pp. 1-6). IEEE); or a LSTM with Generalized End-to-End loss, discussed further in Wan, L., et. al (Wan, L., Wang, Q., Papir, A., & Moreno, I. L. (2018, April). Generalized end-to-end loss for speaker verification. In 2018 IEEE International Conference on Acoustics, Speech and Signal Processing (ICASSP) (pp. 4879-4883). IEEE). In some embodiments, prior to running the base architecture, an optional feature extraction step is applied to the input utterance. Each of the foregoing is hereby incorporated by reference in their entirety. In cases where the present application and a document incorporated by reference conflict, the present application controls.

In some embodiments, the facility first trains a model with the desired base architecture to achieve desired performance on appropriate datasets. In some embodiments, the appropriate datasets are publicly available. In some embodiments, the appropriate datasets are internally constructed by the facility. In some embodiments, the facility employs pruning techniques to the model to reduce the amount of computation and reduce the Multiplicative Depth of the model or of some subpart of the model, while maintaining comparable performance to the original base model. In various embodiments, the facility employs pruning techniques such as reducing number of parameters, reducing number of layers, substituting a given layer with another layer having smaller number of parameters, or applying appropriate regularization to adjust certain parameters to near zero. In some embodiments, the facility employs knowledge distillation techniques, such as to train a different student model to approximate the performance of the original teacher model. In this case, the architecture of the student model is specifically chosen such that running it in inference mode is efficient given homomorphically encrypted input data. In some embodiments, the facility employs various model compression techniques, such as to enable weight sharing between different layers of the neural networks. In addition, the facility performs matrix factorization to reduce the number of parameters of a particular linear layer's weight matrix. In such embodiments, since factorization increases the multiplicative depth by 1, this is only done if the resulting overall depth is within the allowed range. In some embodiments, the facility adds redundant parameters or redundant layers to the network such that some subparts of the resulting model have low Multiplicative Depth, while maintaining comparable performance to the original base model.

In cases where the user data such as the user candidate blob or enrollment blob is not encrypted with homomorphic encryption, the server has the ability to view such data. If the server was a malicious party, the malicious party could employ methods to exploit the user data in unintended ways. Furthermore, an attacker who compromises the server could potentially steal the data for similar exploitation. Thus, in some embodiments, the facility implements various methods to obfuscate the user data on the client side before it is transmitted to the server. In some embodiments, the facility extracts numeric or floating-point features from an input image or voice recording and uses the features as the biometrics data. As it is not possible to reconstruct the exact input from these features, this method is an effective way to obfuscate data.

In some embodiments, the facility implements a secret mask to protect the data transmitted by the client from being exploited by an attacker. In some embodiments, prior to each request for enrollment or authentication, the client and server engage in a round-trip communication step to exchange the secret mask. In some embodiments, the client generates the mask and shares it with the server. In some embodiments, the server generates the mask and shares it with the client. In some embodiments, for each enrollment or authentication request, the user data is masked by the client just before being encrypted and sent to the server. In some embodiments, this secret mask is implemented as an additive mask that the facility adds to the user data or a multiplicative mask to be multiplied with the user data. In some embodiments, the server reverts the mask appropriately and proceeds with other operations as usual.

In mathematics, a function f:X→Y is said to be invertible, or to have an inverse function, if for every y∈Y, there must be exactly one x∈X such that f(x)=y. A matrix M is said to be invertible if and only if it is a square matrix of size m×m and there exists another square matrix O of the same size such that MO=OM=I, the m×m identity matrix. A matrix that is not invertible is called a Singular Matrix. In some embodiments, the facility employs non-invertible functions as a way to obfuscate the original input data, such that, if an attacker were able to intercept the function output, finding the original input is either an ill-defined problem in the mathematical sense, or requires an impractical brute-force search. In some embodiments, the facility protects user data in a defense-in-depth manner by combining feature extraction, non-invertible functions, and secret masks to the user data on the client before it is sent to the server.

In some embodiments, the facility splits the AI Model, f, into N≥2 separate functions $f\_1, f\_2, \ldots, f\_N$ such that the following conditions are met: (1) $f\_N ( \ldots f\_2 (f\_1 (x)))\approx f(x)$; and (2) $f\_1$ is not an invertible function. In some embodiments, the facility implements: $f\_1$ as the Client Pre-Processor; $f\_2$ as the 1st Server Processor which accepts as input the Asymmetric Enrollment Blob and the Asymmetric Candidate Blob; $f\_3$ as the 1st Client Post-Processor which receives the 1st Server Processor's output; $f\_4$ as the 2nd Server Processor to compute another intermediate result, whose input is a ciphertext encrypted with conventional asymmetric encryption scheme ("Asymmetric Ciphertext") and is to be decrypted before the computation; and so on. In some embodiments, if N is an odd number, then $f\_N$ is the $((N-1)/2)$-th Client Post-Processor which computes the final result. In some embodiments, if N is an even number, then $f\_N$ is the N/2-th Server Processor which computes the final result and returns it to the client. This process results in $\lfloor N/2 \rfloor$ round-trip communication between the client and the server. Depending on the application usage and requirements, N can be adjusted to keep the end-to-end processing latency as desired.

Figure 10:
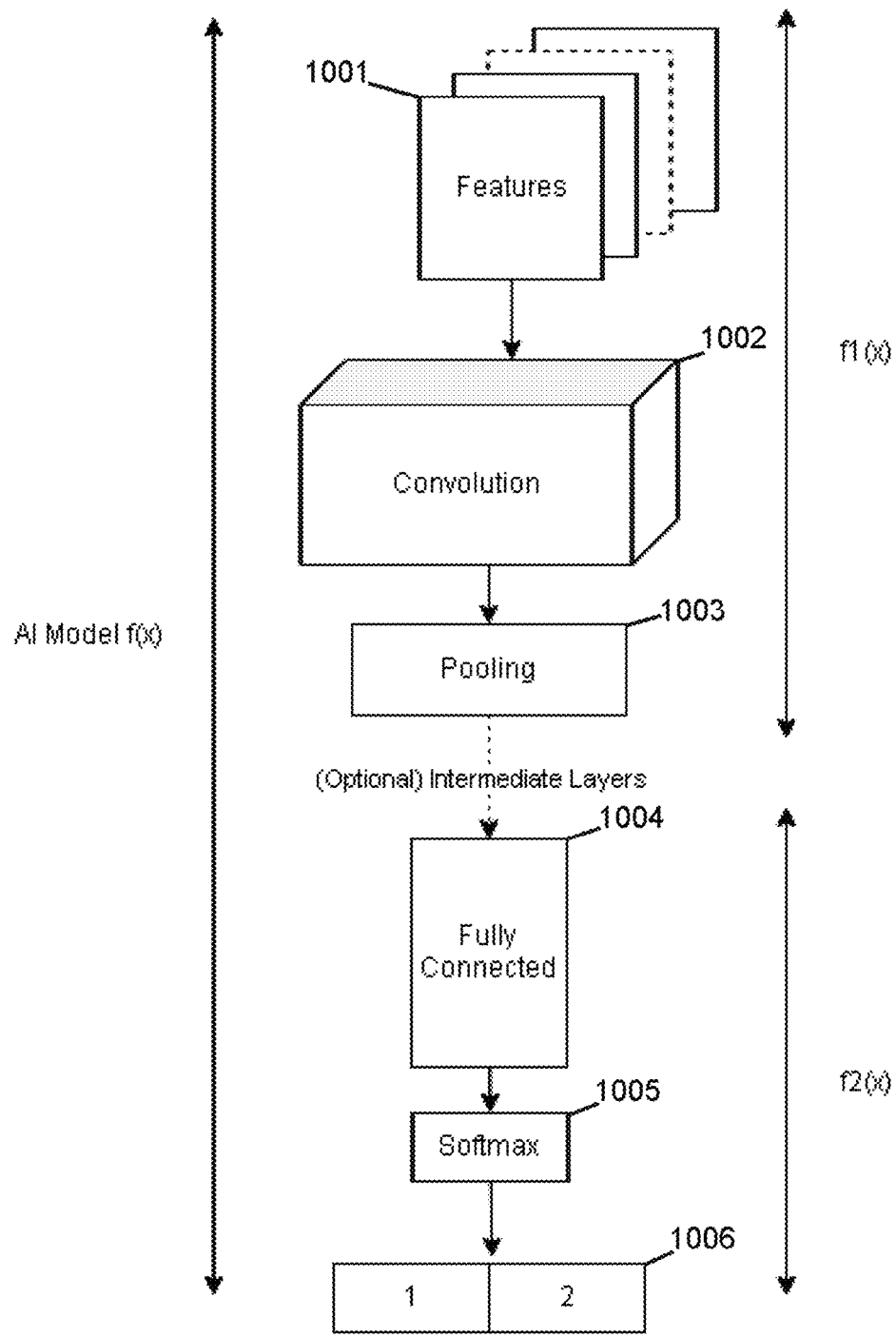
FIG. 10 is a flow diagram showing a process performed by the facility in some embodiments in which a simple AI model is trained on a set of input features to produce a 2-dimensional output vector.

FIG. 10 is a flow diagram showing a process performed by the facility in some embodiments in which a simple AI model is trained on a set of input features to produce a 2-dimensional output vector. The model takes in as input a set of feature values 1001 and passes them to a convolution layer 1002 and then to a pooling layer 1003. After pooling, the output is processed by a fully connected layer 1004 and finally a softmax layer 1005 to produce the binary output 1006. The model is split such that the first function $f\_1$ handles the features 1001, convolution 1002, and pooling 1003. The second function $f\_2$ processes the fully connected layer 1004, softmax 1005, and producing the final output 1006.

In some embodiments, the facility splits the AI Model, f, into 2 separate functions $f\_1$ and $f\_2$ such that the following conditions are met: (1) $f\_1$ is not an invertible function; (2) the Multiplicative Depth of executing $f\_2$ must be no larger than that allowed by the current homomorphic encryption scheme and its parameter settings ("Bounded Multiplicative Depth"). In some embodiments, the facility implements: $f\_1$ as the Client Pre-Processor; $f\_2$ as the Server Verifier which accepts a pair of candidate blob and enrollment blobs as input, and where either but not both blobs have been homomorphically encrypted. In some embodiments, the facility splits the model into 3 functions where the first two functions, $f\_1$ and $f\_2$, are the Client Pre-Processor and Server verifier, respectively, and the third function $f\_3$ is implemented in the Client Post-Processor to compute the final result.

In some embodiments, the facility splits the AI Model, f, into N separate functions $f\_1, \ldots f\_N$ such that the following conditions are met: (1) $f\_1$ is not an invertible function; and (2) $f\_k$ satisfies the Bounded Multiplicative Depth requirement for all k>1, k even. In some embodiments, the facility implements: $f\_1$ as the Client Pre-Processor; $f\_2$ as the 1st Server Processor to compute intermediate result, which accepts the candidate and enrollment blobs as input where either but not both blobs have been homomorphically encrypted; $f\_3$ as the 1st Client Post-Processor which receives the 1st Server Processor's output; $f\_4$ as the 2nd Server Processor to compute another intermediate result and so on. In some embodiments, if N is an odd number, then $f\_N$ is the $((N-1)/2)$-th Client Post-Processor which computes the final result. In some embodiments, if N is an even number, then $f\_N$ is the N/2-th Server Processor which computes the final result and returns a plurality of Single Ciphertexts or Packed Ciphertexts to the client. In some embodiments, the decryption operation happens at the client after receiving the output from any Server Processor in order to reset the accumulative noise growth in the computation to maximize the acceptable Bounded Multiplicative Depth for the next Server Processor function. This process results in $\lfloor N/2 \rfloor$ round-trip communication between the client and the server. In some embodiments, N can be adjusted to keep the end-to-end processing latency as desired.

In some embodiments, the facility splits the AI Model, f, into N separate functions $f\_1, \ldots, f\_N$ such that $f\_k$ satisfies the Bounded Multiplicative Depth requirement for all k>1, even. In some embodiments, the facility implements: $f\_1$ as the Client Pre-Processor; $f\_2$ as the 1st Server Processor to compute intermediate result which accepts as input a pair of candidate and enrollment blobs which have both been homomorphically encrypted; $f\_3$ as the 1st Client Post-Processor which receives the 1st Server Processor's output; $f\_4$ as the 2nd Server Processor to compute another intermediate result; and so on. In some embodiments, if N is an odd number, then $f\_N$ is the $((N-1)/2)$-th Client Post-Processor which computes the final result. In some embodiments, if N is an even number, then f_N is the N/2-th Server Processor which computes the final result and returns a plurality of Single Ciphertexts or Packed Ciphertexts to the client. This process results in $\lfloor N/2 \rfloor$ round-trip communication between the client and the server. In some embodiments, N can be adjusted to keep the end-to-end processing latency as desired.

In some embodiments, the facility implements a system to maintain and store user records along with biometrics data. In some embodiments, at enrollment time, prior to collecting user's biometrics data, the facility collects a plurality of measurements about the user identity ("User Id") such as: user name or nick name, user's first and last name, home address, etc. In some embodiments, the User Id is collected such that it is unique for each user within the facility's database. In some embodiments, once a client has created and transmitted an Asymmetric Enrollment Blob or Homomorphic Enrollment Blob, the server stores the blob in a database using a previously defined User ID as the lookup key. In some embodiments, if the facility is running as a hosted application within a larger system, the parent system may decide where to store the Enrollment Blob for better ease of management. In some embodiments, when the facility before the authentication, the facility prompts a user to enter a User Id and input the user's desired biometric data instead of a conventional password. In some embodiments, when the Candidate Blob reaches the server, the server retrieves the stored Enrollment Blob with the matching User Id for processing such that the server only has to compute against one Enrollment Blob.

In some embodiments, the facility integrates the biometric authentication or verification process into a larger multi-layer authentication system in which it is hosted. In some embodiments, if the facility returns an authentication result which denies the user's access, the facility does one or more of the following: (1) if the confidence level in the prediction is low, it may ask for a repeated measurement of the user's biometric data to attempt another authentication step, and this process may repeat for a number of times as predetermined by the application owner or until the confidence level is high; (2) if the confidence level in the prediction is high or if the facility has attempted too many authentication retries, then the facility may escalate the authentication request to other types of authentications available, such as a conventional Knowledge-Based-Authentication or Multi-Factor Authentication or a One-Time-Authentication-Code.

In some embodiments, the facility applies methods described above to implement a real-time and secure privacy-preserving application beyond biometric verification, where the computation is split across the client and server, with at least one round-trip communication, and where the server has no ability to see the content of the data sent from the client. In various embodiments, the facility is applied to: Text Classification, such as Sentiment Analysis where user's reviews or emails are processed to predict the author's sentiments, Document Classification where a document containing potentially sensitive material is classified into some categories; Recommendation Systems, such as ecommerce Product Recommendation using user review texts as input, or Movie Recommendation using user review texts and ratings as input; Question Answering, such as Chatbot AI using user's sensitive messages to provide an answer; Document Summarization, where a lengthy document such as a news article or a journal publication is used to predict a summary, Medical Diagnosis, where a user's private and personal image is sent to the server for a predictive diagnosis; Self-Driving, where images captured on the road are used to predict the next action for the vehicle; Speech Assistants, where the user's voice request is used to predict a helpful answer; Optical Character Recognition, where sensitive documents are scanned to return the contained text; Translation, where a user's sensitive utterance is used to predict an appropriate translation in the destination language; or Speech Captioning, where the discussions of a potentially classified meeting are converted to a text captions for recording purposes, among other examples.

Figure 11:
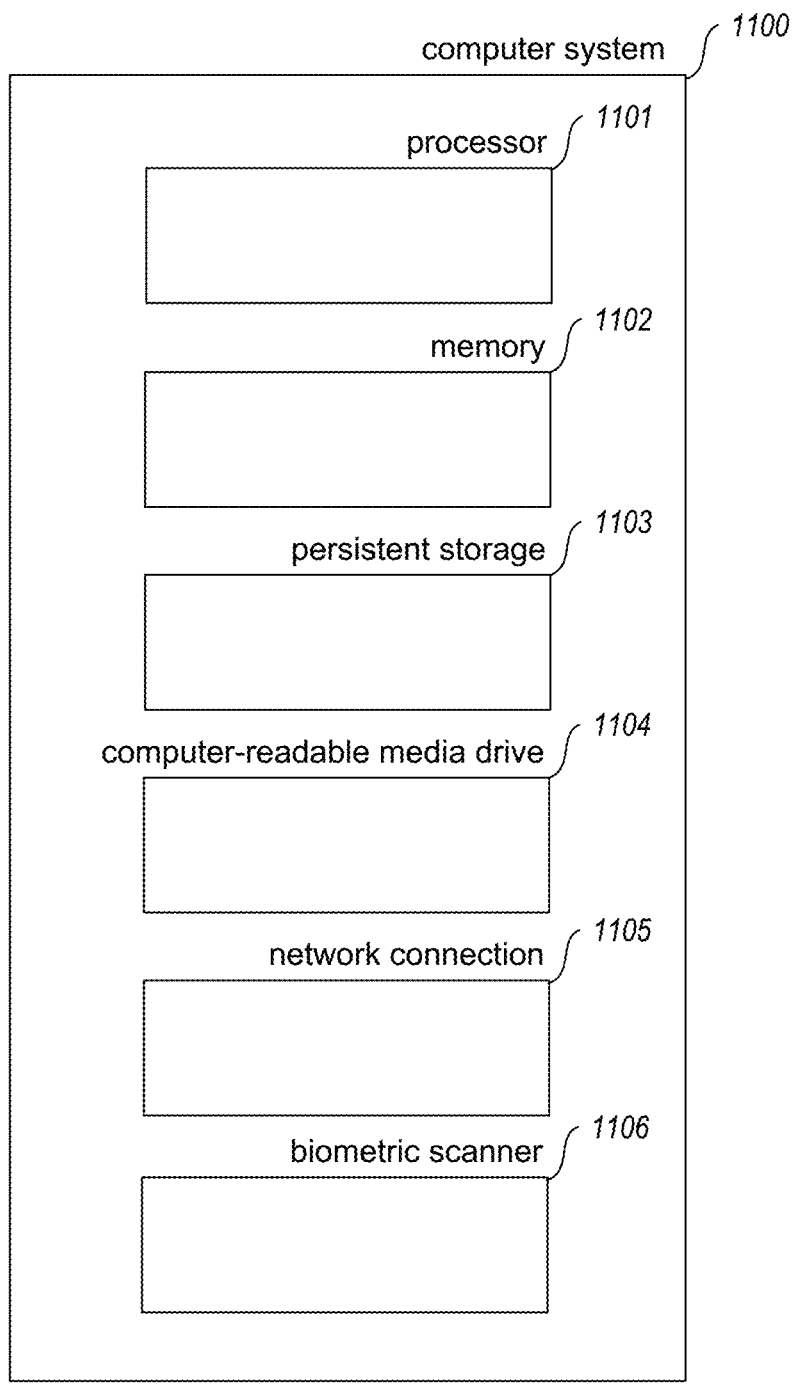
FIG. 11 is a block diagram showing some of the components typically incorporated in at least some of the computer systems, including client devices and servers, on which the facility operates.

FIG. 11 is a block diagram showing some of the components typically incorporated in at least some of the computer systems, including client devices and servers, on which the facility operates. In various embodiments, computer systems 1100 can include mobile phones, tablet computers, personal digital assistants, laptop computer systems, netbooks, cameras, automobile computers, electronic media players, server computers, cloud computers, cloud-based servers, etc. In various embodiments, the computer systems 1100 include zero or more of each of the following: a central processing unit ("CPU") 1101 for executing computer programs; a computer memory 1102 for storing programs and data while they are being used, including the facility and associated data, an operating system including a kernel, and device drivers; a persistent storage device 1103, such as a hard drive or flash drive for persistently storing programs and data; a computer-readable media drive 1104, such as a SD-card, floppy, CD-ROM, or DVD drive, for reading programs and data stored on a computer-readable medium; a network connection 1105 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like; and a biometric scanner 1106 configured to obtain biometric data from a user, such as a microphone, camera, fingerprint scanner, iris scanner, etc. While computer systems configured as described above are typically used to support the operation of the facility, those skilled in the art will appreciate that the facility may be implemented using devices of various types and configurations, and having various components.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system for identifying a user, the system comprising:
   a server storing biometric data, the stored biometric data being usable to identify a user of a computing device, the stored biometric data having been homomorphically encrypted; and a computing device configured to receive user biometric data, the computing device being further configured to:
  homomorphically encrypt the user biometric data; and
  transmit the homomorphically-encrypted biometric data to a server,
the server being further configured to generate an authentication result based on determining whether the user biometric data and the stored biometric data identify the same user, and
the server determining whether the specified biometric data and the stored biometric data identify the same user by using a machine learning model to compare the indicated encrypted biometric data and the stored encrypted biometric data, the server being further configured to:
  split the machine learning model used to determine whether the user biometric data and the stored biometric data identify the same user into one of more sub-models; and
  perform a first portion of the determination by a first sub-model in accordance with the splitting,
and wherein the computing device is configured to perform a second portion of the determination by a second sub-model in accordance with the splitting, the second sub-model being distinct from the first proper sub-model.

2. The system of claim 1, wherein the server is further configured to:
  encrypt the authentication result; and
  transmit the encrypted authentication result to the computing device.

3. The system of claim 1, wherein the computing device is further configured to, before homomorphically encrypting the user biometric data, obfuscate the user biometric data.

4. The system of claim 1, wherein the server is further configured to prune the machine learning model before using the machine learning model to compare the user input biometric data and the stored biometric data.

5. The system of claim 1, wherein the server is further configured to use knowledge distillation techniques to train the machine learning model.

6. The system of claim 1, wherein the server is further configured to compress the machine learning model before using the machine learning model to compare the user input biometric data and the stored biometric data.

7. A system for identifying a user, the system comprising:
  a server storing biometric data, the stored biometric data being usable to identify a user of a computing device, the stored biometric data having been asymmetrically encrypted; and
  a computing device configured to receive user biometric data, the computing device being further configured to:
    homomorphically encrypt the user biometric data; and
    transmit the homomorphically-encrypted biometric data to a server,
the server being further configured to generate an authentication result based on determining whether the user biometric data and the stored biometric data identify the same user, the server being further configured to:
  split a machine learning model used to determine whether the user biometric data and the stored biometric data identify the same user into one or more sub-models; and
  perform a first portion of the determination by a first sub-model in accordance with the splitting,
and wherein the computing device is configured to perform a second portion of the determination by a second sub-model in accordance with the splitting, the second sub-model being distinct from the first proper sub-model.

8. The system of claim 7, wherein the server is further configured to:
  encrypt the authentication result; and
  transmit the encrypted authentication result to the computing device.

9. The system of claim 7, wherein the computing device is further configured to, before homomorphically encrypting the user biometric data, obfuscate the user biometric data.

10. The system of claim 7, wherein the server is further configured to prune the machine learning model before using the machine learning model to compare the user input biometric data and the stored biometric data.

11. The system of claim 7, wherein the server is further configured to use knowledge distillation techniques to train the machine learning model.

12. The system of claim 7, wherein the server is further configured to compress the machine learning model before using the machine learning model to compare the user input biometric data and the stored biometric data.

13. A system for identifying a user, the system comprising:
  a server storing biometric data, the stored biometric data being usable to identify a user of a computing device, the stored biometric data having been homomorphically encrypted; and
  a computing device configured to receive user input indicating biometric data, the computing device being further configured to:
    asymmetrically encrypt the user biometric data; and
    transmit the asymmetrically-encrypted biometric data to a server,
the server being further configured to generate an authentication result based on determining whether the user biometric data and the stored biometric data identify the same user, the server being further configured to:
  split a machine learning model used to determine whether the user biometric data and the stored biometric data identify the same user into one or more sub-models; and
  perform a first portion of the determination by a first sub-model in accordance with the splitting,
and wherein the computing device is configured to perform a second portion of the determination by a second sub-model in accordance with the splitting, the second sub-model being distinct from the first proper sub-model.

14. The system of claim 13, wherein the server is further configured to:
  encrypt the authentication result; and
  transmit the encrypted authentication result to the computing device.

15. The system of claim 13, wherein the computing device is further configured to, before asymmetrically encrypting the user biometric data, obfuscate the user biometric data.

16. The system of claim 13, wherein the server is further configured to prune the machine learning model before using the machine learning model to compare the user input biometric data and the stored biometric data.

17. The system of claim 13, wherein the server is further configured to use knowledge distillation techniques to train the machine learning model.

18. The system of claim 13, wherein the server is further configured to compress the machine learning model before using the machine teaming model to compare the user input biometric data and the stored biometric data.

19. One or more storage devices collectively storing a verification data structure, the data structure comprising:
  information indicating a user;

information specifying homomorphically-encrypted biometric data;
a first sub-model, split from a machine learning model;
a second sub-model, split from the machine learning model; and
information specifying an authentication result,
such that contents of the data structure are directly usable to identify the user in a user authentication system based on the homomorphically-encrypted biometric data,
such that the first sub-model is used to perform a first proper subset of the computations required to identify a user, and such that the second sub-model is used to perform a second proper subset of the computations required to identify a user that is different from the first proper subset.

20. The one or more storage devices of claim 19, the data structure further comprising:
information specifying second encrypted biometric data, the second encrypted biometric data being homomorphically-encrypted,
such that the authentication result indicates whether the second encrypted biometric data indicates the user,
and such that the determination of whether the second encrypted biometric data indicates the user is performed by comparing the encrypted biometric data to the second encrypted biometric data.

21. The one or more storage devices of claim 20, wherein the encrypted biometric data is asymmetrically encrypted.

22. The one or more storage devices of claim 20, wherein the second encrypted biometric data is asymmetrically encrypted.

23. The one or more storage devices of claim 20, wherein the authentication result is encrypted.

24. The one or more storage devices of claim 20, further comprising:
the homomorphically-encrypted biometric data is obfuscated before being encrypted; and
the second encrypted biometric data is obfuscated before being encrypted.

25. The one or more storage devices of claim 19, wherein the machine learning model is pruned before being used to compare the first encrypted biometric data and the second encrypted biometric data.

26. The one or more storage devices of claim 19, wherein the machine learning model has been trained by using knowledge distillation techniques.

27. The one or more storage devices of claim 19, wherein the machine learning model has been compressed before using the machine learning model to compare the first encrypted biometric data and the second encrypted biometric data.

28. A system for identifying a user, the system comprising:
a server storing a representation of biometric data, the stored representation of biometric data being usable to identify a user of a computing device, the stored representation of biometric data being the result of homomorphically encrypting sensed biometric data; and
a computing device configured to receive user biometric data, the computing device being further configured to:
homomorphically encrypt the user biometric data; and
transmit the homomorphically-encrypted biometric data to a server,
the server being further configured to generate an authentication result based on determining whether the homomorphically-encrypted user biometric data and the stored representation of biometric data representation identify the same user without decrypting both the stored representation of biometric data representation and the indicated homomorphically-encrypted biometric data, and
the server being configured to:
split a machine learning model used to determine whether the user biometric data and the stored representation of biometric data identify the same user into one or more sub-models; and
perform a first portion of the determination by a first sub-model in accordance with the splitting,
and wherein the computing device is configured to perform a second portion of the determination by a second sub-model in accordance with the splitting, the second sub-model being distinct from the first proper sub-model.

* * * * *